(12) United States Patent
Posch et al.

(10) Patent No.: US 10,399,565 B2
(45) Date of Patent: Sep. 3, 2019

(54) METHOD AND DEVICE FOR OPTIMIZING DRIVER ASSISTANCE SYSTEMS

(71) Applicant: AVL LIST GMBH, Graz (AT)

(72) Inventors: Rainer Posch, Graz (AT); Juergen Holzinger, Graz (AT); Peter Schoeggl, Hitzendorf (AT); Erik Bogner, Graz (AT)

(73) Assignee: AVL LIST GMBH, Graz (AT)

( * ) Notice: Subject to any disclaimer, the term of this patent is extended or adjusted under 35 U.S.C. 154(b) by 321 days.

(21) Appl. No.: 14/916,340

(22) PCT Filed: Sep. 5, 2014

(86) PCT No.: PCT/EP2014/002414
§ 371 (c)(1),
(2) Date: Apr. 20, 2016

(87) PCT Pub. No.: WO2015/032508
PCT Pub. Date: Mar. 12, 2015

(65) Prior Publication Data
US 2016/0221575 A1    Aug. 4, 2016

(30) Foreign Application Priority Data
Sep. 5, 2013  (AT) .............................. A 50555/2013

(51) Int. Cl.
*B60W 30/12*   (2006.01)
*B60W 50/00*   (2006.01)
(Continued)

(52) U.S. Cl.
CPC ............ *B60W 30/12* (2013.01); *B60W 30/14* (2013.01); *B60W 50/0098* (2013.01);
(Continued)

(58) Field of Classification Search
None
See application file for complete search history.

(56) References Cited

U.S. PATENT DOCUMENTS

| | | | | | |
|---|---|---|---|---|---|
| 2007/0063854 | A1* | 3/2007 | Zhang | ................... | B60W 40/09 340/576 |
| 2007/0182529 | A1* | 8/2007 | Dobler | ................... | B60K 28/06 340/438 |

(Continued)

FOREIGN PATENT DOCUMENTS

| | | |
|---|---|---|
| CN | 101041355 | 9/2007 |
| CN | 103209876 | 7/2013 |

(Continued)

OTHER PUBLICATIONS

English Translation of International Preliminary Report on Patentability for International (PCT) Patent Application No. PCT/EP2014/002414, dated Mar. 17, 2016, 12 pages.

(Continued)

*Primary Examiner* — Jonathan M Dager
*Assistant Examiner* — Garrett F Evans
(74) *Attorney, Agent, or Firm* — Sheridan Ross P.C.

(57) ABSTRACT

The invention relates to a method for optimizing a driver assistance system having the work steps of defining at least one driver assistance system A to be optimized, determining at least one vehicle parameter function that is suitable for characterizing an operating state of a vehicle, and at least one environmental parameter function that is suitable for characterizing the surroundings of the vehicle, calculation of at least one driving situation characteristic function that characterizes a driving situation of the vehicle, particularly at least on the basis of the at least one vehicle parameter function and/or of the at least one environmental parameter function, calculation of at least one control intervention characteristic function that is suitable for characterizing the (Continued)

activity of the driver assistance system A, and calculation of a correction function that depends on the at least one driving situation characteristic function and characterizes a subjective perception of the driving situation by at least one passenger, particularly on the basis of the at least one control intervention characteristic function and on the basis of the at least one vehicle parameter function and/or of the at least one environmental parameter function.

31 Claims, 10 Drawing Sheets

(51) Int. Cl.
| | | |
|---|---|---|
| | *B60W 50/06* | (2006.01) |
| | *B60W 50/10* | (2012.01) |
| | *B60W 30/14* | (2006.01) |
| | *B60W 30/16* | (2012.01) |

(52) U.S. Cl.
CPC ............ *B60W 50/06* (2013.01); *B60W 50/10* (2013.01); *B60W 30/16* (2013.01); *B60W 2050/0088* (2013.01); *B60W 2050/0089* (2013.01)

(56) References Cited

U.S. PATENT DOCUMENTS

| | | | |
|---|---|---|---|
| 2012/0135382 A1* | 5/2012 | Winston | G09B 9/04 434/65 |
| 2015/0105936 A1 | 4/2015 | Grineenval et al. | |

FOREIGN PATENT DOCUMENTS

| | | |
|---|---|---|
| DE | 42 00 694 A1 | 7/1993 |
| DE | 196 14 061 A1 | 10/1998 |
| DE | 10 2007 043 910 A1 | 3/2009 |
| DE | 10 2008 002 699 A1 | 12/2009 |
| DE | 10 2009 028 767 A1 | 2/2011 |
| DE | 10 2010 029 922 A1 | 12/2011 |
| DE | 10 2011 000409 A1 | 8/2012 |
| EP | 0 836 945 A1 | 4/1998 |
| JP | 2008-146332 | 6/2008 |
| WO | WO 2004/045895 A1 | 6/2004 |
| WO | WO 2012/088635 A1 | 7/2012 |
| WO | WO 2013/060507 | 5/2013 |

OTHER PUBLICATIONS

Official Action for China Patent Application No. 201480049086.5, dated Sep. 18, 2017, 9 pages.
International Search Report prepared by the European Patent Office dated Dec. 11, 2014, for International Application No. PCT/EP2014/002414.
Bako Rajaonah et al: "Trust and the use of adaptive cruise control: a study of a cut-in situation", Cognition, Technology & Work, Springer-Verlag, LO, vol. 8, No. 2, Mar. 14, 2006; pp. 146-155.
Official Action with machine translation for Japan Patent Application No. 2016-539435, dated Apr. 27, 2018, 10 pages.
Official Action with English machine translation for China Patent Application No. 201480049086.5, dated Jun. 8, 2018, 23 pages.
Official Action with English Translation for China Patent Application No. 201480049086.5, dated Dec. 26, 2018, 16 pages.

* cited by examiner

Fig. 17

METHOD AND DEVICE FOR OPTIMIZING DRIVER ASSISTANCE SYSTEMS

CROSS REFERENCE TO RELATED APPLICATIONS

This application is a national stage application under 35 U.S.C. 371 and claims the benefit of PCT Application No. PCT/EP2014/002414 having an international filing date of 5 Sep. 2014, which designated the United States, which PCT application claimed the benefit of Austrian Patent Application No. A 50555/2013 filed 5 Sep. 2013, the disclosure of each of which are incorporated herein by reference in their entirety.

The invention relates to a method and a device for optimizing driver assistance systems.

Driver assistance systems (Advanced Driver Assistance Systems—ADAS) are constantly becoming more and more widely used among passenger cars as well as commercial vehicles. Driver assistance systems make important contributions to the enhancement of active traffic safety and serve to increase driving comfort.

Besides the systems aimed particularly at driving safety, such as ABS (Antilock Braking System) and ESP (Electronic Stability Program), a number of driver assistance systems are offered among passenger cars and commercial vehicles such as automatic headlamps, parking assist, cruise control, high-beam assist, emergency braking assist, adaptive cruise control, lane assist, etc. These driver assistance systems increase traffic safety by warning the driver in critical situations and can even initiate an independent intervention for accident avoidance/incident mitigation (e.g., emergency braking function). In addition, driving comfort is increased by functions such as automatic parking, automatic lane keeping and automatic distance control.

The increase in safety and comfort provided by an assistance system is only positively perceived by the passengers if the support provided by the driver assistance system is safe and reliable and—insofar as possible—comfortable. In evaluating these attributes, it must be considered that the person at the steering wheel assesses the assistance system partially from the perspective of driver and partially from that of a passenger. The person at the steering wheel usually evaluates assistance systems more positively than people in the passenger seats due to his or her own ability to make quick interventions on the pedals or steering wheel. Surveys of end clients have shown that the perception of safety requires a relatively long adjustment period, particularly if the driving performance presents itself as rather synthetic, that is, not driver-controlled. It is desirable for the driver assistance system to exhibit the behavior of an ideal driver, particularly when it comes to systems for automated or autonomous driving that independently govern longitudinal velocity and maintain the vehicle in the lane by means of steering interventions.

In latest-generation driver assistance systems, a multitude (in some vehicles, there are more than 20) of radar, video and ultrasonic sensors expand the driver's viewing angle to 360 degrees. Some of these sensors are shown for the sake of example in FIG. 16. The spectrum of support ranges from unburdening and thus increased comfort through visual, acoustic and/or haptic warnings to the strengthening of the driver reaction. Some systems can also make corrective interventions in emergencies, for instance through autonomous braking maneuvers in order to avoid an accident or reduce the severity of an accident.

From among the abundance of new or upgraded driver assistance systems, the driver assistance functions of distance control (ACC—Adaptive Cruise Control) and lane assist (LKA—Lane Keeping Assist) are outlined as functions for automated/autonomous driving.

Adaptive cruise control: Adaptive cruise control unburdens the driver in terms of maintaining his own vehicle at the desired distance from a vehicle ahead of it if that vehicle is traveling more slowly than the desired speed selected by the driver. This generally radar-based basic function is now being updated with a steering assist pilot that supports the driver in the transverse guidance of the vehicle. The steering assist generates a steering torque on straightaways and even on slight curves that helps the driver remain in the middle of the lane. Through targeted steering interventions, the system can increase the driving comfort in the speed range up to 210 km/h and unburden the driver substantially in many traffic situations. At speeds of up to 60 km/h, this so-called Stop&Go Pilot decides in an intelligent manner whether to orient itself based on the vehicle traveling ahead or on the road markings, thus enabling semi-autonomous following even when no road markings or ambiguous road markings are visible. To this end, the system merges the detected data from stereo camera and radar sensors, calculates required reactions, and controls the engine power, gear unit and brake as needed for longitudinal velocity control as well as electrical steering for the lateral guidance of the vehicle.

For example, through the combination of radar and camera, even merging vehicles, vehicles traveling ahead and vehicles traveling ahead of them in the vehicle's own lane and in neighboring lanes can be detected and reacted to in good time. For example, it is possible in this way to prevent passing on the right on freeways and similar federal roads—which is not permitted in Germany—by moderately adjusting the speed to vehicles in the left lane above 85 km/h, particularly in the case of traffic jams that are loosening up and bumper-to-bumper traffic. At lower speeds, it is then possible to pass legally on the right with a maximum speed difference of 20 km/h.

Lane keeping assist: Active lane keeping assists can intervene, for example, in the event of unintended crossing over a broken line if the neighboring lane is occupied and a lane change would therefore entail a collision hazard. The system recognizes this on the basis of information from a stereo camera and the radar system, which has a rear sensor that is effective in combination with the other sensors in the front and rear bumpers. Some examples of critical situations that can be identified by active lane keeping assists are passing vehicles or vehicles to be passed or parallel traffic; however, the system is also effective with oncoming traffic. When a neighboring lane is identified as being occupied, not only does the system warn the driver upon crossing of the lane marking not only haptically through pulsed steering wheel vibrations, it also corrects the lane with a one-sided braking intervention when traveling over broken lines using ESP. The lane keeping assist thus supplements an active blind spot assist and makes it possible to prevent oftentimes serious collisions with oncoming traffic.

The active lane keeping assist is active in the speed range from 60-210 km/h, for example. If a driver activity is detected, for example through steering, braking or acceleration or actuation of the turn signal, the warning and the lane-correcting braking intervention are suppressed.

However, adaptive cruise control and lane keeping assist are only two examples of known driver assistance systems to which newly developed driver assistance systems are constantly being added. Other known examples are described in DE 10 2011 121 537 A1 (break recommendation for the driver), DE 10 2012 002 333 A1 (driving light distribution), DE 10 2012 201 896 A1 (snow-covered roads), DE 10 2012 001 666 A1 (steering assist systems) and DE 10 2011 087 781 A1 (reduction of damage in accidents).

The development ranges all the way to driver assistance systems which enable accident-free and comfortable driving on the one hand and semi- and highly automated or even autonomous driving on the other hand. The development costs of driver assistance systems are very high, since the systems and all of the sensors used must be developed, integrated into the vehicle electronics, calibrated, and tested, for example, in HIL (Hardware in the Loop) environments and in the automobile under all possible environmental conditions.

A large number of test drives with different drivers are therefore necessary for the development and validation of assistance systems. In the case of autonomous driving, since all occupants are passengers of the driver assistance system, it is very important to convey a high subjective perception of safety to all occupants in all driving situations.

Moreover, all driver assistance systems must be specifically adapted to and coordinated with the vehicle model as a function of the respective customer expectations. In addition, the expected driving characteristic (sporty, comfortable, etc.) must also be indicated. This requires considerable development effort, since driver assistance systems generally make use of more complex technology and are interconnected via the vehicle's internal network (e.g., CAN) and also coupled with one another functionally to some extent.

Objectivized assessments of perceived drivability are substantially more difficult than the determination of such things as fuel consumption or pollutant emissions. EP 0 836 945 A1 discloses a method in this regard for analyzing the drivability of a vehicle as a function of driving states.

The focus of the development and calibration of driver assistance systems in vehicles is on the perceived ride quality, the perceived safety and the perceived strain on the vehicle and the vehicle components, which poses great challenges for developers of driver assistance systems due to the complexity of the systems and of the respective subjective ambient awareness of the passengers.

It is an object of the invention to provide a method and a device for optimizing a driver assistance system with little effort, particularly with little testing time and at reasonable cost.

To achieve the object, a method according to claim 1 is proposed as well as a computer program according to claim 19 and a computer-readable medium according to claim 20. A corresponding device is protected in claim 25, and a vehicle is protected in claim 30. Advantageous embodiments of the invention are claimed in the subclaims.

The method according to the invention for optimizing at least one driver assistance system A preferably has the following work steps: the defining of at least one driver assistance system A to be optimized and/or checking whether the at least one driver assistance system A is activated; the determination or detection of at least one vehicle parameter function that is suitable for characterizing an operating state of a vehicle, and/or at least one environmental parameter function that is suitable for characterizing the surroundings of the vehicle, the calculation or determination of at least one driving situation characteristic function that characterizes a driving situation of the vehicle, particularly at least on the basis of the at least one vehicle parameter function and/or of the at least one environmental parameter function; the calculation or detection of at least one control intervention characteristic function that is suitable for characterizing the activity of the at least one driver assistance system A; and the calculation or determination of a correction function that depends on the at least one driving situation characteristic function and is particularly suitable for characterizing a subjective perception of the driving situation and/or of the activity of the driver assistance system A by at least one passenger, particularly on the basis of the at least one control intervention characteristic function and on the basis of the at least one vehicle parameter function and/or of the at least one environmental parameter function.

The device according to the invention for optimizing a driver assistance system has at least one environmental sensor for detecting, particularly for measuring, an environmental parameter that characterizes the surroundings of the vehicle, and at least one vehicle sensor for detecting, particularly for measuring, a vehicle parameter that characterizes an operating state of a vehicle. The device further comprises a first module that is set up to determine or to calculate a driving situation characteristic on the basis of at least one environmental parameter and/or of a vehicle parameter that is suitable for characterizing a driving situation of the vehicle, and a second module that is suitable for monitoring an activity of the driver assistance system and determine or calculate a control intervention characteristic from that, as well as a third module that is set up to determine or to calculate a correction value on the basis of at least one environmental parameter and/or at least one vehicle parameter in dependence on the driving situation characteristic and the control intervention characteristic that is suitable for characterizing a subjective ambient awareness of the driving situation and/or of the activity of the driver assistance system by at least one passenger.

Through the method according to the invention, it is possible in complex driver assistance systems, such as adaptive cruise control and lane keeping assist, for example, to enable semi-automated driving through highly automated driving or even autonomous driving, and the subjective perception and the sense of safety of the passengers can be rendered objectively measurable and evaluable in order to flow back into the development and optimization of the driver assistance system.

In the method according to the invention, both vehicle parameters and environmental parameters can be detected. This enables a comprehensive representation of the driving situation of the vehicle that permits a characterization in terms of a passenger's perception. Both vehicle parameters and environmental parameters can be included in the calculation of the correction function. Through the calculation of the control intervention characteristic function, the activity of the driver assistance system is taken into account in the calculation of the correction function. This is advantageous in the characterization of the driver assistance system with respect to a passenger's sense of safety, since not only the subjective perception of the driving situation but particularly also the reaction of the driver assistance system to this driving situation makes a substantial positive or negative contribution to the passenger's sense of safety.

In particular, the method also offers the possibility of additionally or exclusively considering parameters in the calculation of the correction function or of a correction value other that those that are used to determine the driving situation.

Automatic driving situation identification and the determination of the passenger's external perception of the driving situation enable a substantially faster analysis of measurement data and a targeted, efficient coordination of these driver assistance systems. In addition, the objective evaluation method also enables the optimization of driver assistance systems by means of a simulation, i.e., in a virtual environment or test field.

Therefore, the objective evaluation of driver assistance systems brings about the important possibility of bringing forward the design of the functionality of the systems in the vehicle into the virtual development phase in order to carry out the optimization of the systems in early phases.

The term "driver assistance system" (Advanced Driver Assistance System (ADAS)) in terms of the invention includes any and all types of additional electronic devices in vehicles for supporting the driver in certain driving situations.

An operating state of a vehicle in terms of the invention is characterized by those characteristics which pertain to the vehicle itself and not to its surroundings. Operation parameters are preferably physical parameters or measurable quantities that are suitable for characterizing the operating state of the vehicle. Examples of parameters for characterizing the operating state are speed, engine speed, torque, acceleration, etc.

In terms of the invention, a vehicle is a mobile means of transport used for transporting goods (freight transport), tools (machines or auxiliary means) or people (passenger transport). It is preferably a vehicle that moves on the Earth's surface.

A driving situation in terms of the invention is composed of the operating state of the vehicle and/or the detected surroundings or environment of the vehicle. Particularly, it is the dynamic overall state of the vehicle and of the respective environment or in the respective environment. Preferably, a driving situation is defined by at least one operation parameter of the vehicle and/or by at least one environmental parameter.

In terms of the invention, an environment is the surroundings of the vehicle dictated by other road users, the terrain and the weather. Environmental parameters are preferably physical parameters or measurable quantities that are suitable for characterizing the surroundings of the vehicle, e.g., the distance to the vehicle traveling ahead, its speed, etc.

An activity of a driver assistance system in terms of the invention is any intervention or, in appropriate driving situations, the refraining from intervention in the controlling of a vehicle. The activity can be determined via an interface with the driver assistance system or preferably through monitoring of a variable regulated by the driver assistance system, for example the steering angle in the case of a lane keeping assist. Preferably, the activity and hence the control intervention function is determined only when the driver assistance system is activated. A logical interconnection of activity and activation of the driver assistance system A is advantageous particularly when the control intervention function depends on a vehicle parameter or environmental parameter.

In terms of the invention, perception is understood as the physiological perception of a passenger with their sensory organs. This refers, for example, to the perception of the distance to the vehicle traveling ahead, the illumination of its brake lights, and also the deceleration of the vehicle itself in which the passenger is sitting. One function in terms of the invention is an allocation of at least one parameter value to another parameter value, for example a speed value at a point in time. Preferably, one function is the course of a parameter or of a function value in dependence on time and/or a position.

In terms of the invention, detection is recording, reading, measuring or deriving.

In terms of the invention, determine refers to ascertaining from an allocation or a calculation.

A correction function in terms of the invention is an unambiguous allocation, particularly a function, that can also be mapped by a matrix (two-dimensional table). Preferably, this describes the relation between measured or calculated or simulation-derived physical parameters that characterize the vehicle and environmental status and, optionally, their changes over time, and the physiological perception of at least one passenger. The function value of the correction function depends here on the passengers and the detected activity of the driver assistance system A. Moreover, the function value depends on at least one vehicle parameter and/or at least one environmental parameter. The term "correction function" is used because the distance to a behavior that is regarded as optimal can be determined with it, provided that an appropriate reference is available. The result of the determination or calculation of the correction function can itself, in turn, constitute a function, or a group of correction values or even a single correction value. The result can then be compared to a reference, particularly a reference function, more particularly reference values. In the latter case, the result of the calculation of the correction function can yield a point value between 0 and 10, in which case 10 can then refer to the optimum value.

In an advantageous embodiment of the method, the at least one control intervention characteristic function depends on the driving situation characteristic function and/or is also calculated on the basis of the at least one vehicle parameter function and/or the at least one environmental parameter function.

By virtue of this design, an activity of the driver assistance system can be detected without accessing the data of the driver assistance system. Moreover, the criteria that are used to determine the control intervention can depend on the respective driving situation, whereby every control intervention and every activity of the driving situation can be optimally detected.

In another advantageous embodiment of the method, the at least one control intervention characteristic function and/or the correction function can also depend on the driver assistance system A to be characterized.

By virtue of this design, appropriate criteria can be predefined for each individual vehicle assistance system that need only be called up upon execution of the method.

In another advantageous embodiment of the method, the at least one vehicle parameter function is a tuple of at least one measured vehicle parameter that is optionally time-dependent, and the at least one environmental parameter function is a tuple of at least one measured environmental parameter that is optionally time-dependent.

In another advantageous embodiment of the method according to the invention, the vehicle parameter function, the environmental parameter function, the control intervention characteristic function and/or the correction function each has a parameter value pair, one of the parameter values particularly being the time or the position of a vehicle with a driver assistance system.

In another advantageous embodiment of the method, at least one vehicle parameter and/or at least one environmental parameter is different in the calculation of the correction function and/or control intervention characteristic function and in the calculation of the driving situation parameter function.

In another advantageous embodiment of the method, the correction function additionally depends on fluctuations of at least one vehicle parameter, at least one environmental parameter and/or at least one control intervention characteristic function.

By virtue of this design, disruptive fluctuations or variations can be accounted for that are caused, for example, by the driver assistance system A itself.

In another advantageous embodiment of the method, the at least one control intervention characteristic function is characterized by the presence of a control intervention and/or an intensity of the control intervention of the driver assistance system.

In another advantageous embodiment of the method, the at least one control intervention characteristic function depends on at least one criterion from the group of the following criteria: the cutoff threshold, the exit frequency, the reaction to the vehicle traveling ahead to a change in distance, the reaction time, the response lag and the detection time of the driver assistance system A for an object.

In another advantageous embodiment of the method, if the at least one driving situation characteristic function does not change, the correction function is calculated periodically, particularly for a time interval of a maximum of about 10 s, preferably a maximum of about 5 s.

The periodic calculation of a correction value of the correction function according to this embodiment enables a sensible discrete evaluation of an entire driving cycle, since small measurement fluctuations can be compensated for through the formation of time intervals.

In another advantageous embodiment of the method, if the at least one driving situation characteristic function changes during a time interval, the correction function is calculated for the time period of the preceding driving situation characteristic or driving situation since the last periodic calculation and a periodic calculation of the correction function is initiated for the subsequent driving situation characteristic or driving situation.

The further subdivision of a driving cycle according to this embodiment makes it possible for a correction value of the correction function to always be calculated for a time period in which the same driving state was also present and whose values are therefore comparable.

In another advantageous embodiment of the method, the at least one driving situation characteristic function can adopt as a characteristic at least one driving situation from the group of the following driving situations: following at constant speed, following with acceleration, following with deceleration/braking, following to vehicle stop, following from start, following while merging, following while leaving a line of traffic, following in stop-and-go traffic, approaching a slower object, free acceleration, object detection of a new object, free driving, remaining in lane, lane change, passing, being passed, traffic jam, stop-and-go traffic, and parking forward or in reverse. Additional driving situations can occur as a result of the presence of two of the abovementioned driving situations, for example remaining in lane while following from start. These driving situations are also driving situations in terms of the invention.

In another advantageous embodiment, the method further comprises the following work step: correction—on the basis of the correction value of the correction function—of at least one driving situation criterion that is used by the driver assistance system A to control the vehicle.

In another advantageous embodiment, the method further comprises a work step of determining an evaluation function, particularly an evaluation value, on the basis of the correction function and a reference function. An evaluation function or an evaluation value preferably offers an easily understandable statement for the developer or also company management.

In another advantageous embodiment, the method further comprises a work step of the weighting of the criteria and/or parameters as a function of their respective influence on the subjective perception of the passenger and/or as a function of the type of vehicle. Such weighting enables optimum adaptation of an evaluation to the subjective perception of a passenger.

In another advantageous embodiment, the method further comprises a work step of outputting the correction function and/or the evaluation function.

In another advantageous embodiment of the method, the subjective perception of the activity of the driver assistance system relates to the driving quality of the driver assistance system A, the driving safety, the strain on the vehicle and/or the drivability of the vehicle when using the driver assistance system A.

In another advantageous embodiment, the correction function is suitable for characterizing a safety-related aspect with respect to a vehicle with the at least one driver assistance system, particularly a reduction in speed that is appropriate to the driving situation, a braking deceleration that is appropriate to the driving situation, and/or a steering angle that is appropriate to the driving situation.

In another advantageous embodiment, the method further comprises the following work step: specifying a virtual reality environment in which the at least one vehicle parameter function, the at least one environmental parameter function and/or the driver assistance system A are emulated.

Through the incorporation of simulations/emulations into the characterization process, the method according to the invention can be used even in an early phase of development, which reduces costly testing hours in a real vehicle.

In another advantageous embodiment of the method, the at least one vehicle parameter function has at least one vehicle parameter from the group comprising driving speed, yaw velocity, steering angle, longitudinal acceleration, lateral acceleration, acceleration in the vertical direction, gas pedal position, brake pedal position, engine speed, gear ratio, and the on-state of the driver assistance system A.

In another advantageous embodiment of the method, the at least one environmental parameter function has at least one vehicle parameter from the group comprising the distance to at least one other vehicle, particularly to the leading vehicle, the lateral position of at least one other vehicle, particularly of the leading vehicle, in relation one's own vehicle, the longitudinal position of at least one other vehicle, particularly of the leading vehicle, in relation to one's own vehicle, the relative speed of at least one other vehicle, particularly of the leading vehicle, in relation to one's own vehicle, the relative acceleration of at least one other vehicle, particularly of the leading vehicle, in relation to one's own vehicle, the width of at least one other vehicle, particularly of the leading vehicle, the type of at least one other vehicle, particularly of the leading vehicle, the class of at least one other vehicle, particularly of the leading vehicle, the number of lanes, the roadway profile, one's own driving corridor or one's own pre-calculated driving trajectory, the type of lane boundary, the width of the lane boundary, the curvature of the lane, the yaw angle error, the lane width, the lateral deviation, the distance to the left and/or right lane boundary, the minimum distance to the left and/or right lane boundary during a driving cycle, and the visibility.

In another advantageous embodiment of the method, the at least one passenger is the driver and/or the co-driver and/or a fellow rider in the rear seat of the vehicle.

Since each passenger can occasionally have an extremely different perception of the driving situation, it is advantageous according to this embodiment for the driver assistance system to characterize each of the perceptions of the different passengers individually and collectively.

In another advantageous embodiment of the method, the calculation of the respective at least one characteristic function and of the correction function is performed during and/or after a drive or a simulation of the vehicle.

The features disclosed in relation to the aspect of the invention described above and the associated advantageous embodiments of the method also apply analogously to the aspects of the invention described in the following and to the associated advantageous embodiments of the device for optimizing a driver assistance system and of the vehicle with a driver assistance system. Conversely, the features disclosed in relation to the aspects of the invention described below and to the associated developments of the device for optimizing a driver assistance system and of the vehicle with a driver assistance system also apply analogously to the aforedescribed aspect of the invention and the associated developments of the method.

In an advantageous embodiment of the device, the at least one environmental sensor is selected from the group of forward-looking radar and rearward-looking radar, particularly short-range radar, long-range radar and multi-mode radar, forward-looking lidar (Light Detection and Ranging Device), rearward-looking lidar, ultrasonic sensor, infrared camera, particularly short-/long-range infrared camera and camera in the visible spectral range and image-processing camera, GPS, particularly high-resolution GPS.

In an advantageous embodiment of the device, the at least one vehicle sensor is selected from the group of gyrometer, speedometer, acceleration sensor, normal or high-resolution GPS, vibration sensor, altimeter, measuring device, tachometer, throttle flap sensor, hotwire anemometer, torque meter, switch sensor, tank fill level sensor, and temperature sensor.

In an advantageous embodiment, the device has access to data from the vehicle's internal network or networks, particularly the CAN bus.

In an advantageous embodiment of the device, vehicle sensors and environmental sensors are used, if present, which are installed as standard equipment in the vehicle.

Both of the preceding embodiments reduce the hardware requirement for the device according to the invention, since devices that are present in the vehicle, particularly sensors and measurement pickups, can be used.

Exemplary embodiments of the method and/or of the device as well as additional advantages follow from the following description in conjunction with the figures, details of which are presented here:

FIG. 17 shows a partially schematic view of an evaluation sheet for the preparation of the objectified evaluation criteria for an ACC adaptive cruise control;

Figure 1:
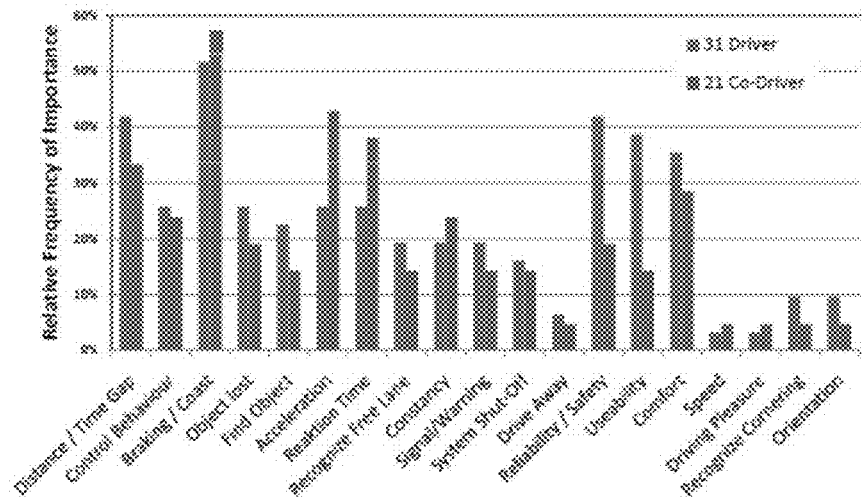
FIG. 1 shows a diagram in which the driver (left bar in each case) and the co-driver (right bar in each case) each cite different criteria for characterizing a driver assistance system.

The system according to the invention relates to the automated characterization and evaluation of the safety and the driving quality of a driver assistance system A on the basis of objectified subjective perceptions of one or more passengers by means of which the driver assistance system A can be optimized in at least one additional step.

The methodology for the objectification of subjective impressions of the passengers includes the objective evaluation of measured vehicle parameters such as longitudinal dynamics (operational and drivability of engine and power train), lateral dynamics (handling, steering, suspension), vertical dynamics (comfort of chassis) and environmental parameters. A large number of driving situations are independently detected from measured variables from sensors and control units, particularly using fuzzy logic, analyzed physically in real time and evaluated preferably online with notes analogously to the subjective perception of drivability experts.

This is demonstrated using the example of the two important driver assistance functions adaptive cruise control and lane keeping assist. However, it is just as possible to optimize any other driver assistance system that enables semi-automated driving or even highly automated/autonomous driving by means of the method according to the invention.

The driving cycles for evaluating the respective driver assistance systems A, here adaptive cruise control and lane keeping assist, are preferably linked to one another to enable evaluation of all of the systems in a driving cycle. The respective driver assistance systems A can just as well be tested individually, however.

Merely for the sake of example, a calibration phase of the system according to the invention will be described below:

Subjective relevant criteria or parameters for the at least one driver assistance system A to be tested are defined on the basis of extensive trial runs by experts and automotive end clients for different driving situations and then evaluated on the basis of these criteria. Driving situations are defined here by value ranges of individual vehicle parameters or environmental parameters or by combinations of vehicle parameters and environmental parameters. Vehicle parameters characterize an operating state of a vehicle, so they relate to parameters that are measured in or on the vehicle or assemblies of the vehicle. Environmental parameters characterize the surroundings of the vehicle, such as distances from the vehicle to objects in the vicinity to be characterized, as well as environmental variables such as the incident solar radiation or the temperature.

For the present driver assistance systems, the vehicle speed $v_{x1}$, yaw velocity, steering angle, longitudinal acceleration $a_{x1}$, lateral acceleration, gas pedal position, brake pedal position, engine speed, gear ratio and on-state of the driver assistance system A are preferably provided as vehicle parameters. The distance $D_x$ to at least one other vehicle, particularly the vehicle traveling ahead, the lateral position of at least one other vehicle, particularly of the vehicle traveling ahead, in relation to one's own vehicle, the longitudinal position of at least one other vehicle, particularly of the vehicle traveling ahead, in relation to one's own vehicle, the relative speed $v_{rel}$ of at least one other vehicle, particularly of the vehicle traveling ahead, in relation to one's own vehicle, the relative acceleration $a_{rel}$ of at least one other vehicle, particularly of the vehicle traveling ahead, in relation to one's own vehicle, the width of at least one other vehicle, particularly of the vehicle traveling ahead, the type of at least one other vehicle, particularly of the vehicle traveling ahead, the class of at least one other vehicle, particularly of the vehicle traveling ahead, the number of lanes, the roadway profile 4, one's own driving corridor or one's own pre-calculated driving trajectory, the type of lane boundary, the width of the lane boundary, the curvature of the roadway, the yaw angle error $\Delta\omega$, the lane width $B_f$, the roadway width, the lateral deviation Q, the distance to the left and/or right lane boundary $D_y$, the minimum distance to the left and/or right lane boundary during a driving cycle, and visibility which characterizes a visual limitation of the driver assistance system A by an obstacle or other environmental influence, are preferably provided as environmental parameters.

The list of parameters is provided merely for the sake of example and is not exhaustive. Preferably, only those vehicle parameters and/or environmental parameters are detected and those measurements performed which are used as a criterion for evaluating the driver assistance system A or a driving situation.

The subjective evaluation of the assistance systems is preferably done both from the driver's and from the passengers' perspective, as well as from the perspective of women and men of different ages and with different driving experience, that is, from different groups of test subjects that ideally statistically reflect the end clients.

After an initial acclimation phase in which the subjects, i.e., the test driver and test passengers, familiarize themselves with the operation and function of the driver assistance system A, questions are posed, preferably using questionnaires, that pertain to the acceptance of the driver assistance system A.

It is possible to determine the necessary parameters for an evaluation of a driver assistance system in individual driving situations, e.g., for adaptive cruise control or lane keeping assist, from the evaluation of the surveyed criteria in conjunction with comments on the questionnaires.

As shown in FIG. 1, in tests that were conducted by the applicant for adaptive cruise control and lane keeping assist A, there turned out to be substantial differences between the criteria named by the driver (left bar in each case) and passenger (right bar in each case). Especially when the lane keeping assist A is activated, the driver—who is not himself steering but is sitting behind the wheel nonetheless—is substantially more sensitive to the normal activity of the steering and perceives different criteria than the subject in the passenger seat. The passenger, on the other hand, tends to be sensitive to changes in lateral acceleration and to visually detected lane changes of the vehicle on the street.

A clear difference also exists in the number of evaluation criteria cited between end clients and experts. Experts name about three times as many criteria as end clients, with experts naming both positive and negative characteristics, while end clients name predominantly negative ones. The sum of all of the criteria named was used for defining the criteria for optimizing or characterizing driver assistance systems.

For each individual criterion associated with a driving situation, at least one measurable vehicle parameter and/or one measurable environmental parameter is preferably established which characterizes this criterion metrologically.

Preferably, driving cycles are carried out with the subjects in a next step, with measurement data of the established vehicle parameters for a multitude of traffic situations being picked up simultaneously by sensors in the vehicle, environmental parameters by radar/lidar, ultrasound and camera systems, and the activity of the at least one driver assistance system A by means of the change in the established parameters or via an interface to the driver assistance system A itself.

After conclusion of the driving cycles, the subjects are questioned once again regarding the criteria determined for different driving situations of the respective driver assistance system A, and they are asked to provide a final evaluation for the respective driver assistance system A and overall by driving situation. The subjects' impressions are preferably recorded using a standardized evaluation sheet, and they are also preferably given the opportunity to provide their comments regarding noticeable issues in relation to the individual control interventions performed by the driver assistance system A. The group of experts evaluates the performance of the driver assistance system A in intervals of preferably about 10 seconds or, in the event of special peculiarities, additionally using a supplementary evaluation sheet with subjective notes on a scale from 1 to 10 (in keeping with the scale according to VDI directives 2563). 10 represents the best evaluation (perturbations can no longer be detected even by experienced evaluators) and 1 the worst evaluation (no longer acceptable).

In evaluating longitudinal dynamics, grading by experts generally has a distribution of only +/−0.5 grades for one criterion. In contrast, there is greater dispersion in the relatively new driver assistance systems. The reasons lie in the novelty of the systems as well as in the number of critical driving situations in which, for example, an adaptive cruise control, a lane keeping assist or an automated/autonomous system is evaluated. Among other things, the braking characteristics and reproducibility during "braking while following" receive subjectively different evaluations.

What is more, after processing and analysis of the data for individual driving maneuvers, scatter can also generally be observed in the reactions of the driver assistance system A even if the test vehicle, the vehicle traveling ahead, the test track and the boundary conditions are held as constant as possible. One example of a driving situation with pronounced scatter in the reaction of a driver assistance system to adaptive cruise control is the driving situation "vehicle traveling ahead brakes moderately (delay about −4 m/s$^2$) until it comes to a stop." There can be several causes for this, which can lie both in the vehicle traveling ahead and in one's own vehicle. As soon as the vehicle traveling ahead begins braking, the brake lights become visible to the driver and passenger. When the brake lights come on, both wait for the initial reaction of the adaptive cruise control and an appropriate adjustment of the distance to the vehicle traveling ahead during braking. However, the adaptive cruise control reacts only in the event of a change in distance to the leading vehicle as predefined in the system, for example because the relative speed or the distance between the two vehicles changes. The evaluation therefore also depends on the vehicle traveling ahead and on the braking style of the driver of the vehicle traveling ahead. As a result, the scatter of the subjective perception is more pronounced here than in other driving situations.

It is when approaching a vehicle traveling ahead that is slower or that is braking that the sensitivity on the part of the passengers with regard to the initiation of braking and braking behavior of an adaptive cruise control is potentially at its highest. The anticipation of the person based on the identification of the overall traffic situation obviously also plays an essential role here. For instance, an appropriate onset of deceleration when quickly approaching a slow-moving vehicle on the freeway with an open passing lane is perceived as being disturbingly early because the driver intends to pass the vehicle. The same behavior on the part of the adaptive cruise control without an open passing lane because, for example, one truck happens to be passing another, is judged to be too late due to the different perception of the environment. In cases in which no free or other lane is available, the critical perception with regard to an excessively late onset of deceleration increases if the vehicle traveling ahead initiates a braking maneuver.

Variations in the evaluation of criteria of the lane keeping assist are generally less pronounced than for an adaptive cruise control, which highlights the sensitivity of subjects with regard to braking behavior.

The abovementioned examples illustrate the high degree of complexity and dependence of human judgment on environmental conditions. The same input variables of vehicle speed, vehicle distance and differential speed can lead to completely different evaluations as a function of different environmental conditions and driving situations. This also illustrates the importance of scene interpretation in addition to the radar measurement technology in the vehicle.

The system according to the invention therefore preferably also analyzes environmental parameters such as the illumination of the brake lights of the vehicle traveling ahead that do not include any physical information on the movement of the vehicle traveling ahead or situation on the street but are used by a passenger to evaluate the driving situation in order to determine a passenger's subjective perception of a driving situation. As a result, the (objective) physical parameters used to evaluate the driving situation can be partially or completely different from the (subjective) physical parameters used to evaluate the perception.

Figure 2:
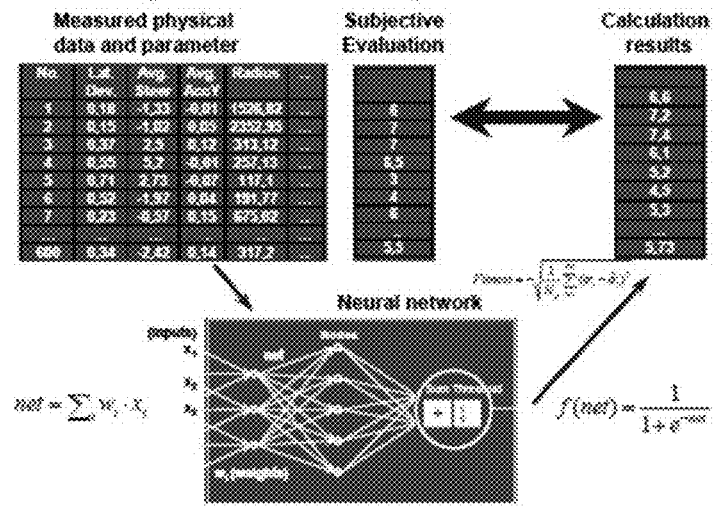
FIG. 2 shows a partially schematic view of the derivation of an evaluation algorithm for a correction function according to the invention.

Subjective evaluations of end clients and experts and the objective measured data of the vehicle parameters and environmental parameters are preferably used to create evaluation algorithms and correction functions, particularly complex, multidimensional formulas, by means of neuronal networks. Such a procedure is illustrated in FIG. 2. It is thus possible to objectively recreate expert evaluations and/or end client evaluations. The system can preferably be set up to assess both a statistically representative group and a respective group of subjects.

This results in a correction function for an objective characterization or evaluation of the subjective perception of a driving situation by a passenger for the attributes driving quality of the driver assistance system A as well as the driving safety, the strain on the vehicle and/or the ride quality of the vehicle while using the driver assistance system A.

The simplest case of a correction function for a driver assistance system A is preferably a table in which detected functions and values and predetermined functions and values are stored in consideration of the respective dependencies. Such a correction function can preferably also be represented as a linear dependence on the respective criteria and parameters for the respective driving situation, in which case the correction value KW of the correction function then preferably has the following result:

$$KW = \underbrace{c_1 \cdot Para_1 + c_2 \cdot Para_2 + c_3 \cdot Para_3}_{\text{Driving situation 1}} + \underbrace{\ldots + c_n \cdot Para_n}_{\text{Driving situation 2}} + \underbrace{c_{n+1} \cdot Para_{n+1} + \ldots}_{\text{Driving situation 3}}$$

A calibration of the system according to the invention can preferably also be done in a different manner, for example in relation to reference driver assistance systems whose good or very good characteristics with respect to the above attributes are already known.

As regards the calibration of such a system, reference is additionally made to previously cited EP 0 836 945 A1.

Once the system according to the invention is calibrated, it can be used to optimize one or more driver assistance systems A simultaneously. Merely for the sake of example, the optimization of a driver assistance system A of a vehicle 5 will be described here, again using the example of adaptive cruise control or the lane keeping assist.

Preferably, the driver assistance system or systems of the vehicle to be optimized—in the present case, the driver assistance system A—are first established by the user or, in automatic mode, by the system itself.

In the following, measurements are taken of the vehicle 5, preferably during a driving cycle, on the basis of which vehicle parameters and environmental parameters can be determined metrologically, preferably by means of sensors. All available parameters are preferably recorded continuously, thus enabling a continuous characterization of the vehicle 5 during the driving cycle.

In order to objectify subjective perception, it is necessary to define physically measurable parameters that correlate with subjective perception. In the driver assistance system A being examined, these are substantially different physical parameters, since the adaptive cruise control influences the longitudinal dynamics of the vehicle 5 and the lane keeping assist influences the lateral dynamics as well. There is preferably an obvious main parameter for each driving situation. The quality of the distance control of the adaptive cruise control is preferably dependent upon the distance to the vehicle traveling ahead. To achieve a good correlation, besides the likely most important main parameters, a greater number of additional physical parameters are preferably also measured. In the case of distance control, these are preferably, inter alia, distance, absolute and relative speed with respect to the vehicle traveling ahead, relative longitudinal acceleration, lateral acceleration, lane width, oncoming traffic, etc.

These are preferably grouped together in a respective vehicle parameter function and an environmental parameter function which, also preferably, depend on time or a position of the vehicle. The parameter functions therefore preferably form tuples or vectors of individual vehicle parameters or environmental parameters.

The current driving situation is determined on the basis of the vehicle parameter function and/or the environmental parameter function. The driving situation describes the operating state of the vehicle and/or the surrounding traffic situation to which the vehicle is exposed and which must be coped with. This determination of the driving situation is preferably done by calculating the current value of a driving situation characteristic function.

Furthermore, a criterion for characterizing the activity of the driver assistance system A is determined. Since a provision is preferably not made for the system according to the invention to have access to information from the driver assistance system A, the activity, particularly the presence of a control intervention and/or an intensity of the control intervention of the driver assistance system A, is derived from the measured vehicle parameter(s) and the measured environmental parameter(s). Alternatively, the activity can be read out via an interface to the driver assistance system A. Criteria that merit particular consideration for characterizing the activity are the cutoff threshold, the exit frequency, the reaction to the vehicle traveling ahead, the reaction to a lane departure, the reaction time, the response lag and the detection time for an object, i.e., the amount of time that passes before the driver assistance system A detects a certain object, of the driver assistance system A. The criterion observed for determining the presence of a control intervention also preferably depends on the driving situation or on the value of the driving situation characteristic function and/or the driver assistance system A being met. For instance, the reaction to a distance deviation is observed for the adaptive cruise control, and the reaction to a lane departure is observed for the lane keeping assist. The criteria for the activity, i.e., the intervention or non-intervention, of the driver assistance system are preferably calculated on the basis of the vehicle parameter function and/or the environmental parameter function, that is, using at least one vehicle parameter and at least one environmental parameter from these functions. The activity of the driver assistance system A is preferably determined via a control intervention characteristic function.

Finally, a correction function is determined to characterize or express the subjective perception of the present driving situation by at least one passenger, preferably on the basis of at least one vehicle parameter and/or at least one environmental parameter; the correction function preferably also depends on the respective driving situation and a control intervention that may have been performed. The criterion or criteria being observed for the perception of the respective driving situation preferably depend on the driver assistance system A to be characterized. The determination of the correction function for the subjective perception is preferably done via a characteristic value, the correction function or the characteristic value preferably reflecting the dependencies of the evaluation algorithms prepared or trained by means of neuronal networks.

If the driving situation characteristic function does not change, the correction function is preferably calculated periodically, particularly for a time interval of no more than about 10 s, preferably of no more than about 5 s. If the driving situation characteristic function changes during such a time interval, the correction function is preferably calculated for the time period of the preceding driving situation characteristic or of the preceding driving situation since the last periodic calculation. In addition, a new periodic calculation of the correction function is initiated for the subsequent driving situation characteristic or driving situation.

The control intervention characteristic and, more preferably, the at least one correction function preferably also depends on the vehicle assistance system A to be characterized. For example, different functions are preferably used for the characterization of a distance control than for a lane keeping assist.

During the calculation of the correction function and/or of the control intervention characteristic function, at least one vehicle parameter and/or at least one environmental parameter from the vehicle parameter function and/or the environmental parameter function is preferably used that is not used in the calculation of the driving situation parameter function. Conversely, however, during the calculation of the driving situation parameter function, at least one vehicle parameter and/or at least one environmental parameter from the vehicle parameter function and/or the environmental parameter function can also be used that is not used in the calculation of the correction function and/or control intervention characteristic function. The same also applies between the calculation of the correction function and the calculation of the control intervention characteristic function.

For the sake of example, the characterization of the external perception of the driver for the driving quality of a lane keeping assist on the basis of the criterion of lateral control quality is shown for which the steering wheel angle and yaw angle or yaw angle error, speed, lateral acceleration, lane curvature as well as the position of the trajectory of the vehicle (distance to the edge of the lane, distance to the middle of the lane) are used as physical parameters that preferably constitute the environmental parameter and/or vehicle parameter or from which they are derived. In each driving situation—free driving in this case—the vehicle is to follow a trajectory within the lane that is perceived by the driver as pleasant and safe.

Above all, strong gradients and varying components (irregularities) in the signals for steering wheel angle, yaw angle and lateral acceleration have substantial impacts on the lateral control quality, since any twitching in the steering or with respect to the direction of travel is perceived as unpleasant and sometimes as unsafe as well.

The selected driving line is perceived by the passengers as confident and safe if the driving line, through a combination of curves, corresponds largely to an ideal line with maximally large radii and harmonious changes in direction.

Figure 3:
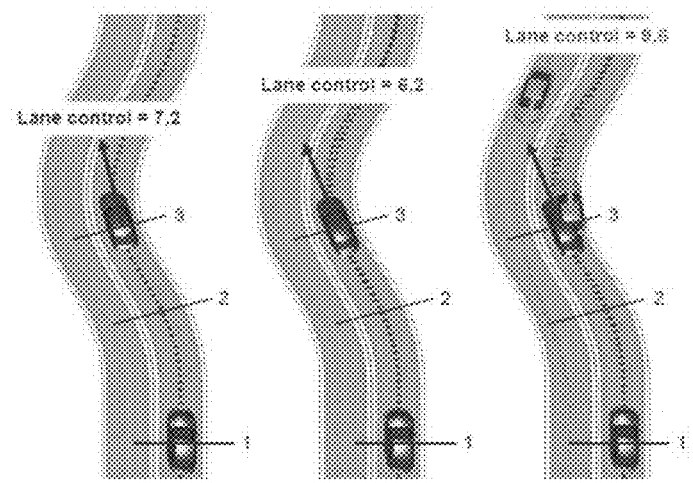
FIG. 3 shows a partially schematic view of different driving lines of a driver assistance system which correspond to different correction values of the correction function according to the invention.

To the left in FIG. 3, one can see the selected driving line exactly in the middle of the lane for a slight left-right curve combination. In the analysis of the subjective perception, this selected driving line is evaluated as acceptable with respect to lane keeping due to the relatively clear directional changes at waypoints P2 and P3.

In the middle of FIG. 3, one can see a slightly delayed reaction of the lane keeping controller in relation to the middle of the lane; in this case, the relatively pronounced changes in direction are perceived and evaluated as too late and thus also as unsafe at waypoint P3 because the car is steered too far in the direction of the opposite lane and oncoming traffic.

The right lane selection to the right in FIG. 3, indicated by a broken arrow, corresponds to an ideal line with the largest possible radii of curvature and smallest possible directional changes within the lane. This behavior was given the best evaluation in terms of perceived safety and driving quality. On the one hand, the example illustrates the challenges associated with the lateral control quality and coordination of lane keeping assists as well as the high level of complexity of objectively representing a human being's subjective perception of lane keeping on the basis of measurable physical parameters.

For the driver assistance system of distance control, the following parameters are preferably used as a function of the respective driving situation to characterize or express a passenger's subjective perception:

For the driving situation Following at constant speed, the parameters speed $v_{rel}$ relative to a neighboring vehicle, particularly minimum speed and maximum speed as well as the standard deviation of the speed in a time interval, control duration of the distance control, which characterizes the settling time of the controller, distance $D_x$ to the neighboring vehicle, particularly the minimum distance, the maximum distance as well as the standard deviation during a time interval, speed $v_{x1}$ of the guided vehicle 5, particularly the mean value during a time interval, desired vehicle speed, time gap to the neighboring vehicle as well as acceleration $v_{rel}$ relative to the neighboring vehicle, particularly the minimum value, the maximum value as well as the standard deviation during a time interval.

The existence of the driving situation Following at constant speed is preferably assumed if the vehicle to be followed has an acceleration that is less than 0.3 m/s² in a time period of 4 s. The driving situation is preferably assumed to have ended if the speed of the vehicle to be followed is greater than 0.3 m/s² or if the vehicle is lost. The acceleration of the vehicle to be followed is an environmental parameter.

Figure 4:
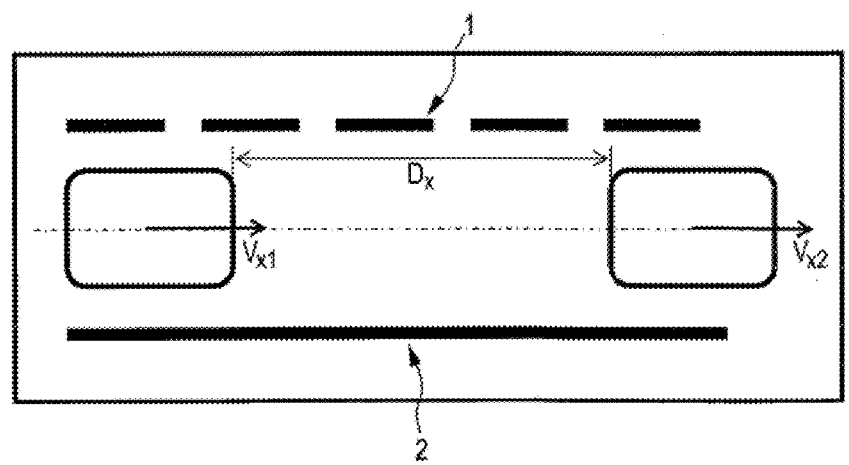
FIG. 4 shows a partially schematic view of a driving situation of following at constant speed.
Figure 5:
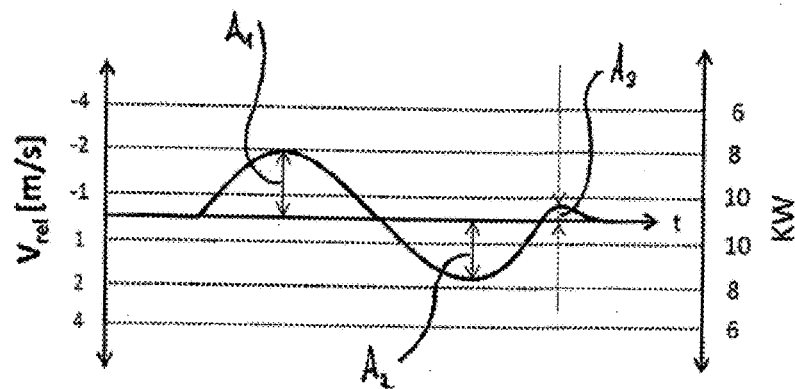
FIG. 5 shows a partially schematic view of a speed adjustment process of a driver assistance system.

Various parameters preferably to be observed in relation to the driving situation Following at constant speed are shown in FIG. 4 and FIG. 5.

FIG. 4 shows a typical driving situation Following at constant speed, in which the neighboring vehicle traveling ahead is being followed. The desired distance as well as the speeds $vx_1$, $vx_2$ of the guided vehicle 5 as well as the vehicle $v_{x2}$ to be followed are shown. The distance control is intended to guide the vehicle between the left lane boundary 1 and the right lane boundary 2 at a desired distance to the vehicle traveling ahead, this distance to the vehicle traveling ahead being an environmental parameter.

FIG. 5 shows a process for adjusting the speed $v_{x1}$ of the guided vehicle 5 to the speed $v_{x2}$ of the vehicle traveling ahead once the desired distance X has been achieved. In particular, the control duration and the amplitudes A1, A2, A3 of the control deviation can be derived during the adjustment process. The control duration of the distance control as well as the amplitudes A1, A2, A3 characterize the activity of the driver assistance system A and, as shown, are derived from the environmental parameter $v_{rel}$, particularly by means of a control intervention function. A simplified dependence of the correction value KW of the correction function from the amplitudes A1, A2, A3 is also shown, with other parameters that might have an influence on this parameter being disregarded merely for the sake of the example.

For the driving situation Following with acceleration of the neighboring vehicle, the parameters are taken into account: response lag, distance $D_X$ to the neighboring vehicle, particularly the minimum distance, the maximum distance and the standard deviation during a time interval, speed $v_{x1}$, particularly the minimum speed, the maximum speed and the mean value during a time interval, desired speed, time gap to the neighboring vehicle, speed relative to the neighboring vehicle, particularly the minimum value, the maximum value and the standard deviation during a time interval, acceleration relative to a neighboring vehicle, particularly the minimum value, the maximum value and the standard deviation during a time interval, chassis acceleration, i.e., the acceleration at the respective passenger seat rail and/or expected chassis acceleration, i.e., the acceleration that can be achieved by the respective guided vehicle 5.

The driving situation Following with acceleration is preferably assumed to be present if the acceleration $v_{x2}$ of the vehicle to be followed is greater than 1 m/s² in a time interval of greater than 2 s. The driving situation is preferably assumed to have ended if the acceleration of the vehicle to be followed is less than 0.51 m/s² or if this vehicle is lost.

Figure 6:
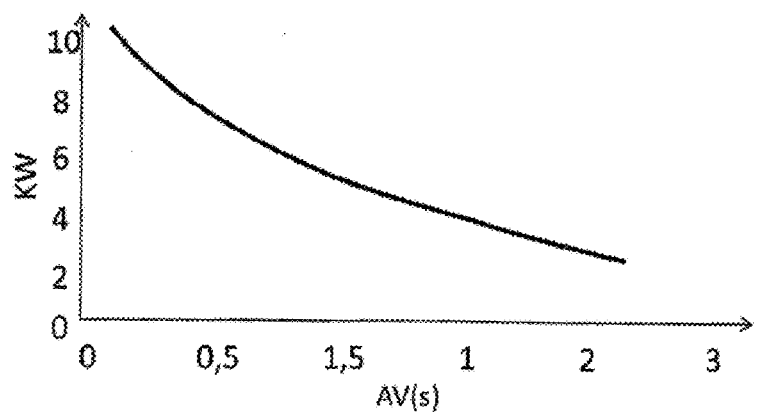
FIG. 6 shows a partially schematic view of a diagram for the dependence of the correction function on the response lag $\Delta V$.

A simplified representation of the dependence of the correction value KW of the correction function as a function of the response lag AV (in seconds) is shown in FIG. 6. Other parameters that might be observed for Following with acceleration are being disregarded here.

Figure 7:
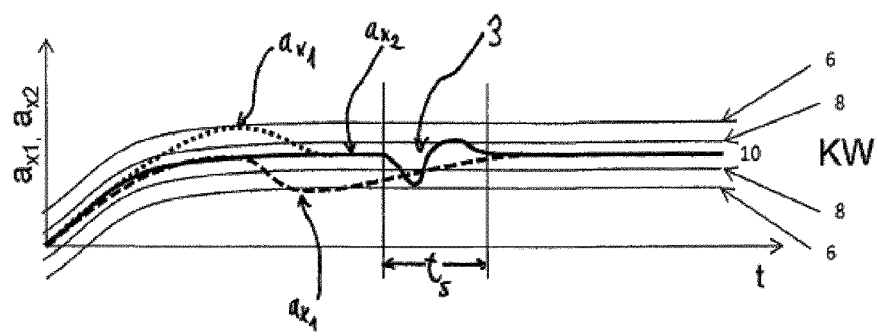
FIG. 7 shows a partially schematic view of the influence of the relative acceleration on the correction function.

For the sake of example, FIG. 7 shows the influence of relative acceleration on the correction value KW of the correction function. Depending on how strong the acceleration $a_{x1}$ of the vehicle being guided with the distance control deviates from the acceleration $a_{x2}$ of the vehicle traveling ahead (dotted curve for the case of greater acceleration $a_{x1}$ of the guided vehicle; broken curve for the case of greater acceleration $a_{x2}$ of the vehicle traveling ahead), and disregarding other potentially relevant parameters, decreasing correction values KW are allocated.

Fluctuations 3 in the acceleration of the vehicle traveling ahead should be excluded from the calculation of the characteristic. FIG. 7 also shows such a fluctuation 3 in the case of the vehicle traveling ahead changing gears. The region $t_s$ is therefore removed in a characterization.

Another driving situation for adaptive cruise control is "Following with deceleration or with braking," for which the following parameters are preferably taken into account: reaction time of the distance control, distance $D_x$ to the vehicle traveling ahead, particularly the minimum distance, the maximum distance and the standard deviation during a time interval, speed $v_{x1}$, particularly the minimum speed, the maximum speed and the mean value during a time interval, desired speed, time gap, which characterizes the distance to the person in front, relative speed, particularly the minimum value, the maximum value and the standard deviation during a time interval, relative acceleration, particularly the minimum value, the maximum value and the standard deviation during a time interval, chassis acceleration and/or collision duration.

The driving situation Following with braking is preferably present if the braking deceleration of the vehicle to be followed is less than −1 m/s² during a time period of greater than 1 s. The driving situation Following with slowing is preferably present if the acceleration of the vehicle to be followed is less than −0.21 m/s².

Figure 8:
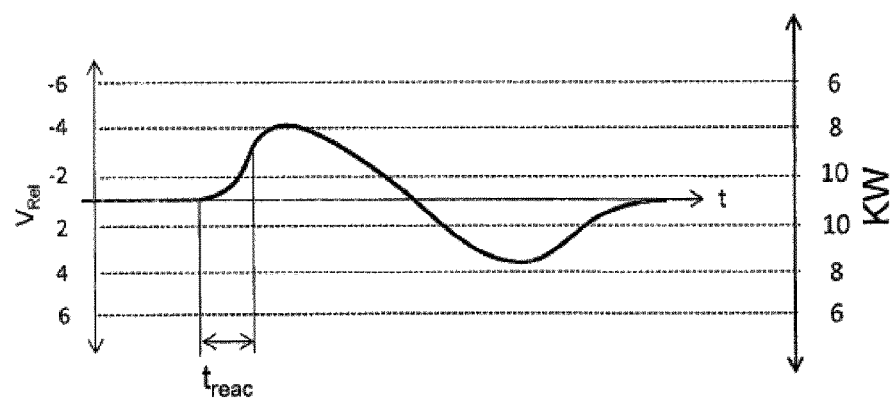
FIG. 8 shows a partially schematic view of the influence of the minimum value and the maximum value of a relative speed on a correction function.

FIG. 8 shows the influence of the minimum value and the maximum value of the relative speed on the correction value KW of the correction function if other potentially relevant parameters are not included. The greater the maximum value of the relative speed $v_{rel}$, i.e., the deviation in the speed $v_{x1}$ of the vehicle 5 being guided with the distance control in relation to the vehicle to be followed, the worse (or lower) the correction value KW. From this figure, it is also possible to determine the reaction time $t_{reac}$ from the environmental parameter relative speed $v_{rel}$. While disregarding other potentially relevant parameters, the influence of the parameter reaction time $t_{reac}$ on the correction value of the correction function is similar to that of the response lag AV in relation to the driving situation Following with acceleration, shown in FIG. 6.

Another driving situation for adaptive cruise control is preferably Following until stopping of vehicle, with the parameters distance to the vehicle to be followed, particularly the minimum distance during a time interval, chassis acceleration during the braking operation, and braking pressure upon stopping.

Figure 9:
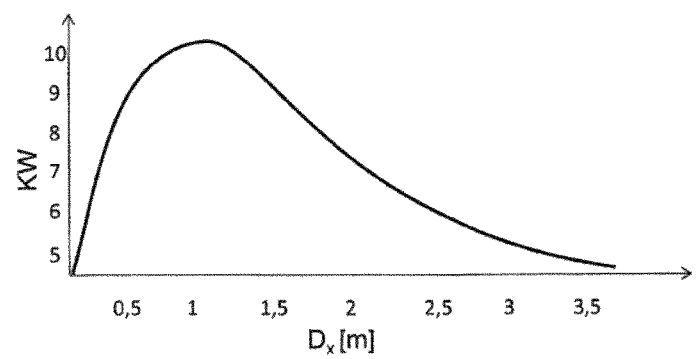
FIG. 9 shows a partially schematic view of a dependence of the correction function on the distance to the vehicle to be followed.

The driving situation Following until stopping of vehicle is preferably present if the vehicle speed $v_{x2}$ of the vehicle to be followed is less than 0.3 m/s during a time period of greater than 1 s. The driving situation Following until stopping of vehicle has preferably ended if the vehicle 5 guided by the distance control comes to a standstill. A diagram of a preferred dependence of the correction function on the distance $D_x$ to the vehicle to be followed, when other potentially relevant parameters are disregarded, is shown in FIG. 9.

Another driving situation for adaptive cruise control is preferably Following upon driving off, with the parameters distance $D_x$ to the vehicle to be followed upon driving off, particularly the maximum distance or the mean value during a time interval, response lag AV, relative speed $v_{rel}$, particularly the maximum speed or the mean value in a time interval, the relative acceleration a, particularly the maximum value or the mean value in a time interval, the chassis acceleration, particularly the minimum value, the maximum value or mean value in a time interval and/or the expected chassis acceleration.

The driving situation Following upon driving off is preferably present if the acceleration $a_{x2}$ of the vehicle to be followed is greater than 1 m/s². The driving situation Following upon driving off has preferably ended if the vehicle 5 guided by the distance control also has an acceleration $a_{x1}$ of greater than 1 m/s². As the distance $D_x$ of the guided vehicle 5 to the vehicle to be followed increases, a correction value KW of the correction function tends to decrease if other potentially relevant parameters are disregarded.

Two other different driving situations for adaptive cruise control are preferably "Following while merging" and "Following while leaving a line of traffic," with the parameters response lag AV, distance $D_x$ to the vehicle merging into or leaving a line of traffic, particularly as a minimum distance or mean value in a time interval, the control duration, which represents the adjustment duration of the driver assistance system A, the speed $v_{rel}$ relative to the vehicle merging into or leaving a line of traffic, particularly the maximum value or the mean value in a time interval, the relative acceleration, particularly the maximum value or the mean value in a time interval, the chassis acceleration, i.e., the acceleration at the seat rail of the respective passenger, particularly the minimum value, the maximum value or mean value in a time interval, the speed $v_{x1}$, particularly the mean value in a time interval, the desired speed and the time gap to the vehicle merging into or leaving a line of traffic.

Figure 10:
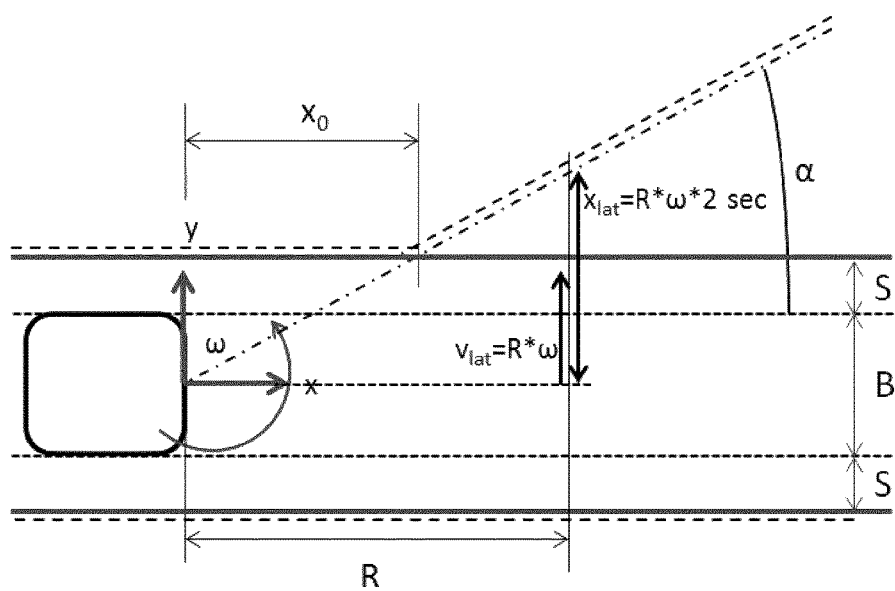
FIG. 10 shows a partially schematic view of a two-second safety corridor.

The driving situation "Following while merging into or leaving a line of traffic" is preferably present if an object merges into the driving corridor, particularly into the 2-second safety corridor, with it being preferable for the merging object or vehicle to have a width of at least 1 m. The driving situation "Following while merging" has ended if the speed $v_{rel}$ relative to the merged vehicle reaches a value of less than 0.5 m/s. The 2-second safety corridor is shown for the sake of example in FIG. 10. This depends on the parameters vehicle width $F_y$ of the guided vehicle, the safe distance S, which depends on the speed of the guided vehicle, the distance to the merging vehicle $D_x$ and the yaw angle ω of the guided vehicle. If no object or vehicle is located within this region, which is also designated by a broken line, the safety corridor is free (the so-called 2-second prognosis).

The driving situation "Following while leaving a line of traffic" is preferably present if a vehicle is identified as leaving a line of traffic, that is, if a vehicle traveling ahead leaves the driving corridor or if the vehicle traveling ahead is less than 0.5 m within the driving corridor. The driving situation Following while leaving a line of traffic has preferably ended if the speed relative to the new vehicle traveling ahead is less than ±0.5 m/s or, if no vehicle is traveling ahead, the desired vehicle speed $V_{x1}$ of the guided vehicle has been reached. The correction value KW of the correction function increases as the reaction time decreases in the driving situation Following while leaving a line of traffic, if other potentially relevant parameters are disregarded.

Another possible driving situation for adaptive cruise control is preferably Acceleration with clear roadway, with the parameters reaction time, desired speed, chassis acceleration, expected chassis acceleration, vehicle speed $v_{x1}$, particularly the mean value in a time interval, the ratio of driving corridor to lane width $B_f$, particularly the mean value in a time interval, and the extent of occupancy of the driving corridor.

Another possible driving situation for adaptive cruise control is preferably Approaching a slower object, for which the following parameters are preferably taken into account: reaction time of the distance control, distance $D_x$ to the vehicle traveling ahead, particularly the minimum distance, the maximum distance and the standard deviation during a time interval, speed $v_{x1}$, particularly the minimum speed, the maximum speed and the mean value during a time interval, desired speed, time gap, which characterizes the distance to the person in front, relative speed, particularly the minimum value, the maximum value and the standard deviation during a time interval, relative acceleration, particularly the minimum value, the maximum value and the standard deviation during a time interval, chassis acceleration and/or collision duration. The driving situation Approaching a slower object is preferably present if an object greater than 0.5 m wide enters the driving corridor and one's own driving speed is greater than that of the object traveling ahead. The driving situation Approaching a slower object has preferably ended if a reaction of the system according to the invention is detected, particularly if a minimum distance to the vehicle traveling ahead has been created through braking with a relative speed of zero. The correction value KW of the correction function decreases as the minimum distance decreases in the driving situation Approaching a slower object, if other potentially relevant parameters are disregarded.

Another possible driving situation for adaptive cruise control is preferably Detection of an object, with the parameters detection time for an object, driving corridor, relevant objects in the driving corridor and losing of the object. The driving situation Detection of an object is preferably present if an object greater than 0.5 m wide enters the driving corridor. The driving situation Detection of an object has preferably ended if a reaction of the system according to the invention is detected, particularly in the event of braking or acceleration of greater than 0.5 m/s². In the event of a detected object, the correction value KW decreases as the reaction time $t_{reac}$ decreases if other potentially relevant parameters are disregarded.

For the driver assistance system A lane keeping assist and the driving situation Normal driving without lane change, the following criteria are preferably used to characterize the external perception by at least one passenger with the respectively named parameters: lane keeping with the parameters Distance of lateral deviation, i.e., the distance from the middle of the vehicle $M_v$ to the middle of the lane $M_f$, particularly as a maximum distance, the mean value and the standard deviation over a time interval, the vehicle speed $v_{x1}$, particularly as a mean value, and/or the lane width $D_{trans}$, particularly as a mean value, minimum value or maximum value of a time interval. Another preferred criterion is the lateral control quality, with the parameters yaw angle error $\Delta\omega$, particularly as a mean value, maximum value and standard deviation over a time interval, lateral acceleration of the vehicle $a_{y1}$, particularly as a mean value or maximum value over a time interval, lane curvature and/or vehicle speed $v_{x1}$, particularly as a mean value, the criterion distance left $D_l$ and distance right $D_r$, with the parameters distance to the left and/or right lane boundary, particularly minimum distance or mean value during a time interval, lane width $B_f$, particularly as a mean value or minimum/maximum during a time interval, the lateral deviation Q, particularly as a mean value or maximum during a time interval, the vehicle width $B_v$ and/or the vehicle speed $v_{x1}$, particularly as a mean value over a time interval.

Figure 11:
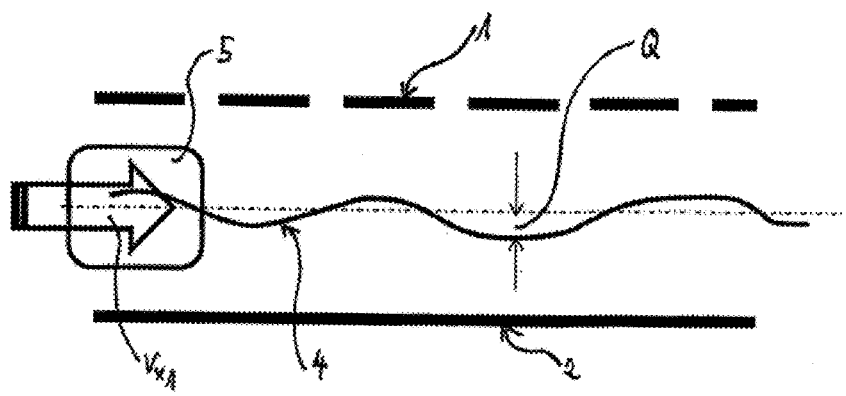
FIG. 11 shows a partially schematic view of the shape of a trajectory of a vehicle.
Figure 12:
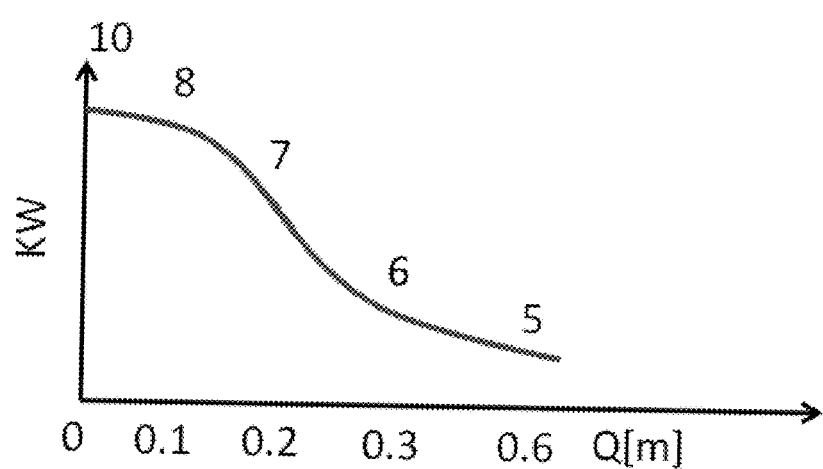
FIG. 12 shows a partially schematic view of the influence of the lateral deviation on the correction function.
Figure 13:
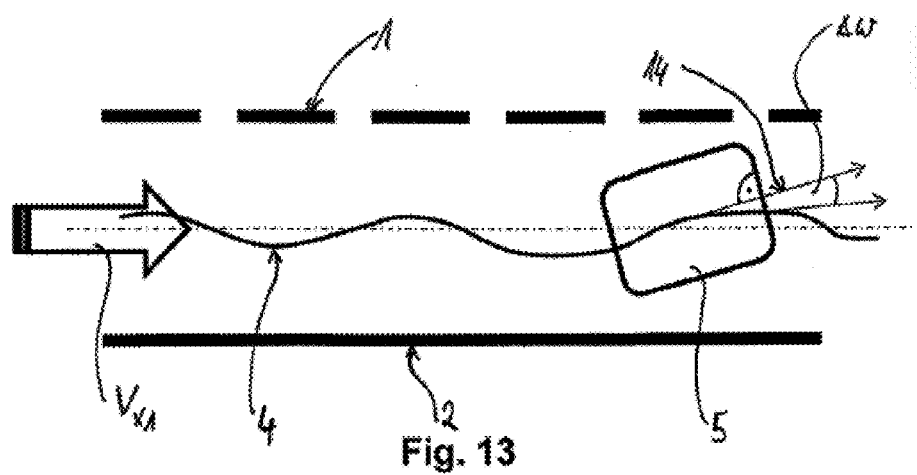
FIG. 13 shows a partially schematic view of the yaw angle error.

FIG. 11 shows the position of the middle of the lane $M_f$ in relation to the left edge of the lane 1 and the right edge of the lane 2 as well as the lateral deviation Q in relation to a trajectory 4 of the vehicle 5. The diagram from FIG. 12 shows the influence of the lateral deviation Q on the correction value KW of the correction function while disregarding other potentially relevant parameters. FIG. 13 shows the yaw angle error $\Delta\omega$, which is defined as the angular deviation between the vehicle longitudinal axis 14 and the trajectory 4 of the vehicle 5. Similarly to the dependence shown in FIG. 12, the influence of an increasing yaw angle error $\Delta\omega$ leads to a reduction in the correction value KW of the correction function, particularly if other potentially relevant parameters are disregarded.

Figure 14:
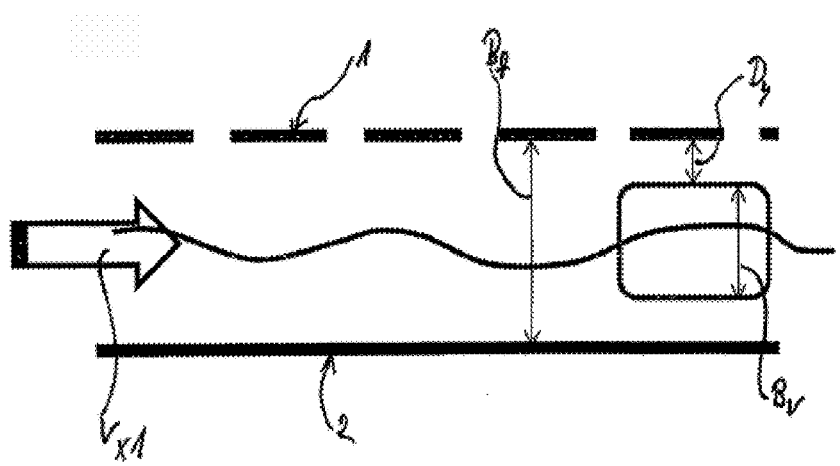
FIG. 14 shows a partially schematic view of various vehicle parameters and environmental parameters.

FIG. 14 illustrates the parameters vehicle width $B_v$, lane width $B_f$ and the distance $D_l$ to the left lane boundary 2. The subjective external perception of the driving situation is preferably characterized here via the relative lane boundary distance $D_{rel}$. This is calculated as follows, where $D_{max}$ is the distance to the lane boundary 1, 2 if the vehicle 5 is located exactly in the middle of a lane:

$$D_{max} = \frac{(B_f - B_v)}{2}$$

-continued
$$D_{rel} = \frac{(D_{max} - D_l)}{D_{max}}$$

Similarly to the dependence shown in FIG. 12, the influence of an increasing relative lane boundary distance $D_{rel}$ leads to a reduction in the correction value KW if other potentially relevant parameters are disregarded.

Another criterion that is preferably used to evaluate the driver assistance system A or a driving situation is the cutoff threshold, with the parameters mean or maximum lateral acceleration when the lane keeping assist is switched off, and steering angle when it is switched off and/or the steering torque when it is switched off.

Another criterion that is preferably used to evaluate the driver assistance system A or a driving situation is the exit frequency of the driver assistance system, with the parameters lane quality, i.e., exits of the lane keeping assist as a result of faulty lane detection per hour, particularly as a mean value over a time interval and/or vehicle speed $v_{x1}$, particularly as a mean value over a time interval.

Another criterion that is preferably used to evaluate the driver assistance system A or a driving situation is the visibility, the parameters distance to the vehicle traveling ahead, particularly as a mean value over a time interval, lane quality, particularly as a mean value, and/or the lane curvature, particularly as a mean value over a time interval.

If an evaluation is carried out on the basis of the correction function or correction value and a reference function or reference values, the individual criteria are preferably evaluated individually. The evaluation of the individual driving situations, in turn, and finally an overall assessment are compiled from these evaluations of the individual criteria. The individual criteria are also preferably weighted as a function of their influence on human perception with respect to the driving performance of the driver assistance system to be optimized. For example, for the evaluation of the driving situation Following at constant speed, the parameter relative speed $v_{rel}$ is preferably incorporated with five-fold weighting, while the parameter distance $D_x$ is incorporated with only singular weighting. In the evaluation, a differentiation is also preferably made according to vehicle type (for example, SUV, passenger car, truck, etc.). Finally, extreme values are preferably weighted more strongly, since it has been shown that extreme driving situations or control interventions or errors in the control intervention by the driver assistance system are perceived more strongly, particularly more negatively, by the driver.

The system according to the invention can be used in a real driver assistance system A in a real vehicle 5 that moves in a real environment. Preferably, however, the system can also be used for optimizing driver assistance systems A that are characterized in a virtual reality environment in which the vehicle parameter function and/or the environmental parameter function are emulated. Finally, the activity of a driver assistance system A can also be simulated in order to enable characterization thereof at the earliest possible stage of development.

Figure 15:
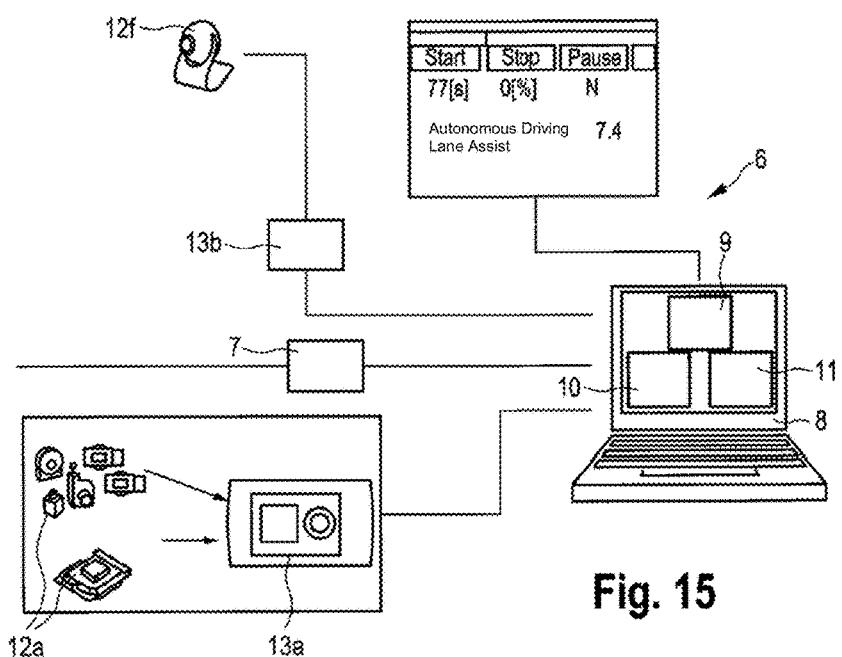
FIG. 15 shows a partially schematic view of the measurement setup of a device according to the invention for optimizing a driver assistance system.

FIG. 15 shows the measurement setup of a system according to the invention, and thus a device 6 for optimizing a driver assistance system. The device preferably has an interface 7 to the vehicle's on-board network (e.g., CAN) in order to have access to the data there. Moreover, the device preferably has a central processing unit 8 that has a first module 9 which calculates a driving situation characteristic that characterizes a driving situation of the vehicle on the basis of an environmental parameter and/or a vehicle parameter, a second module 10 which calculates a control intervention characteristic on the basis of an environmental parameter as a function of the driving situation characteristic, and a third module 11 which calculates a correction value KW that characterizes a subjective external perception of the driving situation by at least one passenger on the basis of the control intervention characteristic and on the basis of an environmental parameter and/or a vehicle parameter as a function of the driving situation characteristic.

The parameters are determined via a series of sensors that are preferably processed in a signal processing device 13a, 13b. Examples of environmental sensors that merit use are forward-looking radar and rearward-looking radar, particularly short-range radar 12a, long-range radar 12b and multi-mode radar 12c, forward-looking lidar, rearward-looking lidar, ultrasonic sensor 12d, infrared camera, particularly short-/long-range infrared camera 12e and camera in the visible spectral range and image-processing camera 12f and high-resolution GPS. Examples of vehicle sensors that merit use are gyrometers, speedometers, acceleration sensors, high-resolution GPS, vibration sensors, altimeters, measuring devices, tachometers, torque meters, switch sensors, and tank fill level sensors. The sensors can be provided as additional sensors, or vehicle sensors and environmental sensors can preferably be used, if present, that are installed as standard equipment in the vehicle.

Figure 16:
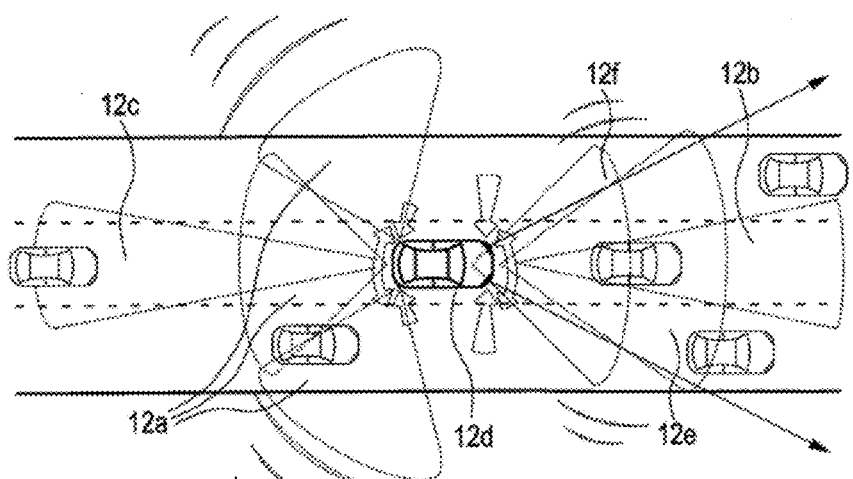
FIG. 16 shows a partially schematic view of an arrangement of sensors on a vehicle.

FIG. 16 shows a preferred arrangement of the radar/lidar sensors 12a, 12b, 12c, the ultrasonic sensors 12d, short-/long range infrared camera 12e, and a stereo camera 12f.

Figure 17:
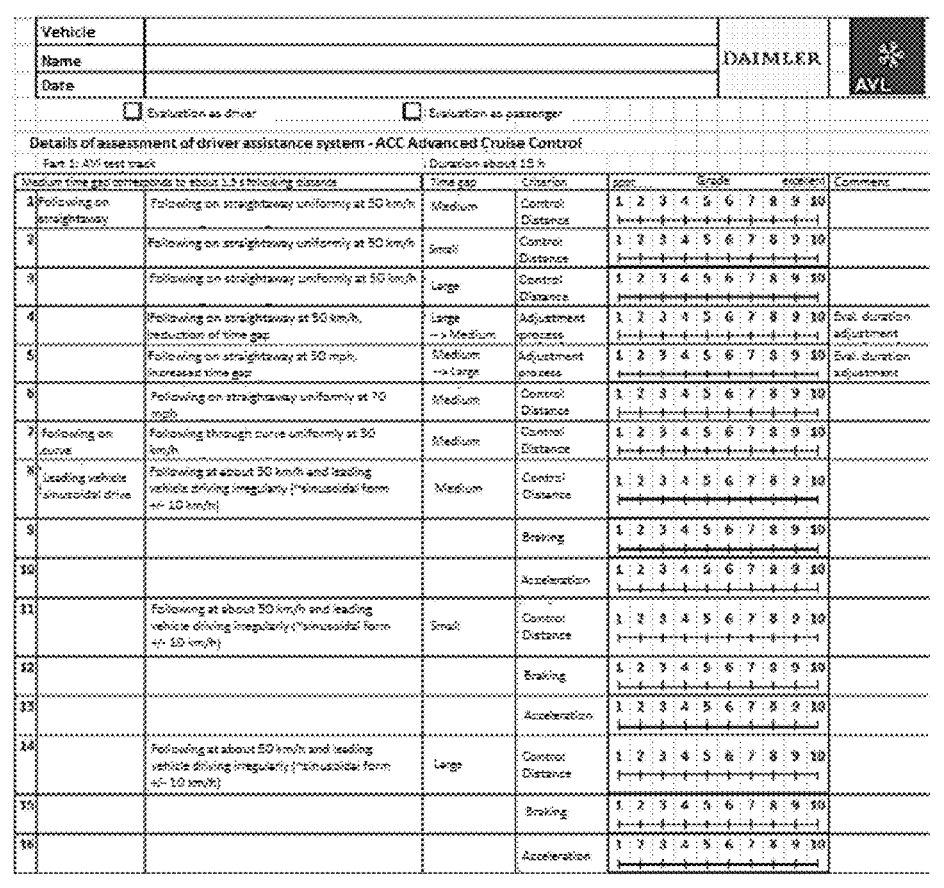

FIG. 17 shows a typical evaluation sheet used by experts for the assessment of an adaptive cruise control and as preferably used for the training of the system according to the invention. On the evaluation sheet shown, for the three driving situations "Following on straightaway," "Following through curve" and "Leading vehicle sinusoidal drive," it is possible to assess evaluations as drivers or as passengers in relation to various criteria, such as "Distance control" and "Braking actions" or also "Acceleration actions." The driving situations are preferably broken down into additional driving situations, to wit: "Following on straightaway," "Following on straightaway uniformly at 50 km/h with medium time gap," "Following on straightaway uniformly at 50 km/h with small time gap," and "Following on straightaway uniformly at 50 km/h with large time gap," i.e., with a large time-cushion to the vehicle traveling ahead.

Figure 18:
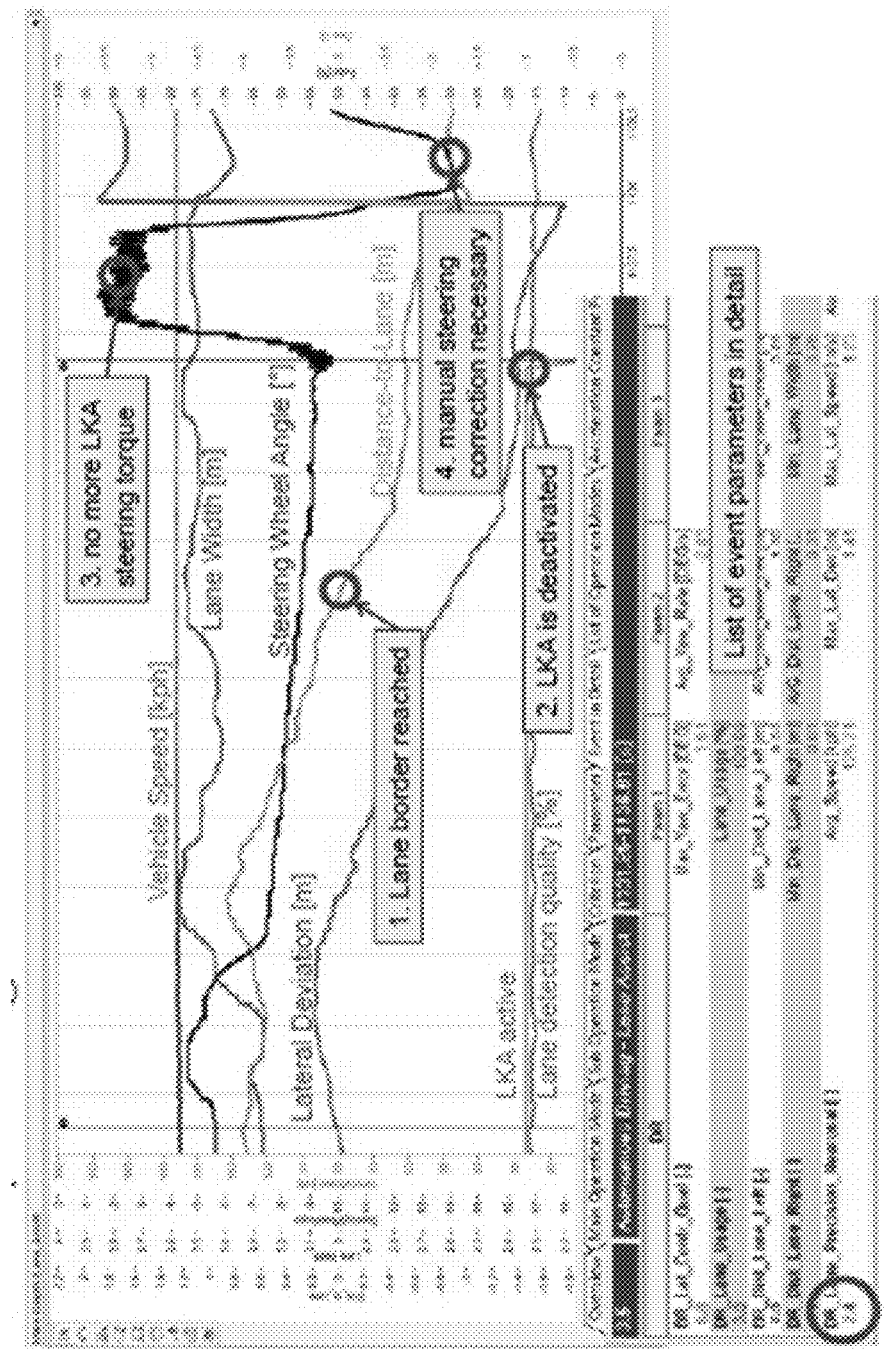
FIG. 18 shows a partially schematic view of a profile of measured data and detected data for different parameters, i.e., different functions according to the invention.

FIG. 18 shows a sample analysis for an event during a test drive in which a lane keeping assist is optimized and analyzed as driver assistance system A. Shown there are the time profile of the vehicle parameters "vehicle speed" and "steering angle of the steering wheel" as well as the time profile of the environmental parameters "lane width," "lateral deviations of the vehicle from the middle of the lane," and "distance to the lane." In the lower region of the diagram, the activity of the lane keeping assist is indicated by a line, along with the lane detection quality. After a certain time, the roadway boundaries are reached at 1. If the lane deviation undershoots a certain threshold, the lane keeping assist is deactivated at 2, which manifests itself as the dropout of the lane keeping assist activity line. After that, at 3, the lane keeping assist no longer has any steering torque, so the driver must intervene manually into the steering and perform a steering correction in order to return the vehicle to the lane. The activity of the driver assistance system A, of the lane keeping assist in the present case, is detected via the lane keeping assistant activity line and via the steering angle of the steering wheel, which is selected by the lane keeping assist. In this way, they constitute a control intervention characteristic function over the time axis. In the depicted example, the driving situation is identified via the vehicle speed and, optionally, the lateral deviation of the vehicle from the middle of the lane. In this way, they preferably constitute a driving situation characteristic function. In the present case, the distance to the lane or the lateral deviation over time could be used to evaluate the criterion of lane quality, i.e., as the basis for a correction function that preferably constitutes an environmental parameter function. This is also preferably set as a function of the detected control intervention characteristic function and the driving situation characteristic function. In the example illustrated in FIG. 18, the activity of the driver assistance system A, i.e., of the lane keeping assist, leads to such a deviation from the lane that it must be deactivated or that the support by the lane keeping assist must be interrupted and the driver must take over the steering of the vehicle manually. This preferably leads to a commensurately low evaluation for the criterion of lane quality of the lane keeping assist being analyzed.

Preferably, the system according to the invention is used in a vehicle with a driver assistance system A, with the driver assistance system A monitoring a driving situation of a vehicle with respect to at least one driving situation criterion that is stored in the driver assistance system A and, if a driving situation criterion is not met, influences the driving situation by means of a control component through at least one control intervention. After a correction value for characterizing the subjective perception of the at least one passenger has been calculated, the system according to the invention can preferably change the driving situation criterion that is used by the driver assistance system A to control the vehicle on the basis of the respective correction value KW of the correction function in order to ensure optimized control by the driver assistance system A in the next same or similar driving situation. The system according to the invention can be arranged in the vehicle for this purpose, but it can also be arranged in another location to which a data connection can be established from the vehicle.

Even though the system according to the invention was explained in the foregoing on the basis of the driver assistance system A, distance control and lane keeping assist for the sake of example, the general principles apply to all types of driver assistance systems A even if the criteria and measured parameters thereof are different.

What is claimed is:
1. A method for optimizing at least one driver assistance system for controlling at least a portion of a vehicle, having the following work steps:
   checking whether the at least one driver assistance system is activated;
   detecting at least one of a vehicle parameter by means of at least one vehicle sensor and an environmental parameter by means of at least one environmental sensor, said vehicle parameter characterizing an operating state of the vehicle, said environmental parameter characterizing the surroundings of the vehicle; and
   providing a central processing unit for performing the following steps:
      determining at least one of a vehicle parameter function based on the vehicle parameter and an environmental parameter function based on the environmental parameter;
      determining at least one driving situation characteristic function that characterizes driving situations of the vehicle, at least on the basis of at least one of the vehicle parameter function and the environmental parameter function;

determining at least one control intervention characteristic function that determines an activity of the at least one driver assistance system in a current driving situation indicated by a current value of the at least one driving situation characteristic function, wherein the activity includes a control intervention and an intensity of the control intervention or non-intervention; and determining a correction function that depends on the at least one control intervention characteristic function and the at least one driving situation characteristic function, wherein the correction function objectively characterizes a subjective perception of the control intervention and the intensity of the control intervention or non-intervention of the driver assistance system in the current driving situation by at least one passenger based on at least one of the vehicle parameter function and the environmental parameter function.

2. The method as set forth in claim 1, further comprising the following work step:

establishing the at least one driver assistance system to be optimized.

3. The method as set forth in claim 1, wherein the at least one control intervention characteristic function depends on the at least one driving situation characteristic function and is also calculated on the basis of at least one of the vehicle parameter function and the environmental parameter function.

4. The method as set forth in claim 1, wherein the at least one control intervention characteristic function and/or the correction function also depends on the driver assistance system to be characterized.

5. The method as set forth in claim 1, wherein the vehicle parameter function is a tuple of at least one measured vehicle parameter that is optionally time-dependent, or the at least one environmental parameter function is a tuple of at least one measured environmental parameter that is optionally time-dependent.

6. The method as set forth in claim 1, wherein at least one of the vehicle parameter function, the environmental parameter function, the control intervention characteristic function, and the correction function each has a parameter value pair, with one of the parameter values being the time or the position of the vehicle with the driver assistance system.

7. The method as set forth in claim 1, wherein the at least one of the vehicle parameter and the environmental parameter is different in the calculation of the correction function or the control intervention characteristic function, and in the calculation of the driving situation characteristic function the vehicle parameter or the environmental parameter is different.

8. The method as set forth in claim 1, wherein the correction function additionally depends on fluctuations in at least one of the vehicle parameter, the environmental parameter, and the at least one control intervention characteristic function.

9. The method as set forth in claim 1, wherein the at least one control intervention characteristic function depends on at least one criterion from the group of the following criteria: a cutoff threshold, an exit frequency, a reaction to the vehicle traveling ahead, a reaction to a lane deviation, a reaction to a change in the driving situation, a reaction to a distance deviation, a reaction time, a response lag, and a detection time of the driver assistance system for an object.

10. The method as set forth in claim 1, wherein if the at least one driving situation characteristic function does not change, the correction function is calculated periodically for a time interval of a maximum of about 10 s.

11. The method as set forth in claim 1, wherein, if the at least one driving situation characteristic function changes during a time interval, the correction function is calculated for a time period of a preceding driving situation characteristic or driving situation since the last periodic calculation and a periodic calculation of the correction function is initiated for a subsequent driving situation characteristic or driving situation.

12. The method as set forth in claim 1, wherein the at least one driving situation characteristic function can assume at least one driving situation from the group of the following driving situations as a characteristic: following at constant speed, following with acceleration, following with deceleration/braking, following to vehicle stop, following from start, following while merging, following while leaving a line of traffic, free acceleration, approaching a slower object, object detection, free driving, remaining in lane, lane change, passing, being passed, traffic jam, stop-and-go traffic, and parking in forward or reverse.

13. The method as set forth in claim 1, further comprising the following work step:

correction, on the basis of a correction value of the correction function, of at least one driving situation criterion that is used by the driver assistance system to control the vehicle.

14. The method as set forth in claim 1, further comprising the following work step:

determining an evaluation function as a function of the correction function and a reference function.

15. The method as set forth in claim 1, further comprising the following work step:

weighting of at least one of criteria and the parameters as a function of their respective influence on the subjective perception of the passenger and/or as a function of a vehicle type.

16. The method as set forth in claim 14, further comprising the following work step:

allocation of at least one of the correction function and the evaluation function.

17. The method as set forth in claim 1, wherein the subjective perception of the control intervention and the intensity of the control intervention or non-intervention of the driver assistance system relates to at least one of a driving quality of the driver assistance system, a driving safety, a strain on the vehicle, and a drivability of the vehicle when using the driver assistance system.

18. The method as set forth in claim 1, wherein the correction function characterizes a safety-related aspect with respect to the vehicle with the at least one driver assistance system, wherein the correction function is at least one of a speed reduction that is appropriate to the current driving situation, a braking deceleration that is appropriate to the current driving situation, and a steering angle that is appropriate to the current driving situation.

19. The method as set forth in claim 1, further comprising the following work step:

specifying a virtual reality environment in which at least one of the vehicle parameter function, the environmental parameter function, and the driver assistance system are emulated.

20. The method as set forth in claim 1, wherein the vehicle parameter function has at least one vehicle parameter selected from the group consisting of: a driving speed, a yaw velocity, a steering angle, a longitudinal acceleration, a lateral acceleration, a vertical acceleration, gas pedal position, a brake pedal position, an engine speed, a gear ratio, and an on-state of the driver assistance system.

21. The method as set forth in claim 1, wherein the environmental parameter function has at least one environmental parameter selected from the group consisting of: a distance to at least one other vehicle, a lateral position of the at least one other vehicle in relation one's own vehicle, a longitudinal position of the at least one other vehicle in relation to one's own vehicle, a relative speed of the at least one other vehicle in relation to one's own vehicle, a relative acceleration of the at least one other vehicle in relation to one's own vehicle, a width of the at least one other vehicle, a type of the at least one other vehicle, a class of the at least one other vehicle, a number of lanes, a roadway profile, one's own driving corridor, one's own pre-calculated driving trajectory, a type of a lane boundary, a width of the lane boundary, a curvature of the lane, a yaw angle error, a lane width, a lateral deviation, a distance to a left or right lane boundary, a minimum distance to the left or right lane boundary during a driving cycle, and a visibility.

22. The method as set forth in claim 1, wherein the at least one passenger is at least one of a driver, a co-driver, and a fellow rider in a rear seat of the vehicle.

23. The method as set forth in claim 1, wherein the calculation of the respective at least one characteristic function and of the correction function is performed during a drive, after the drive, during a simulation of the vehicle, or any combination thereof.

24. A computer program, comprising instructions which, when executed by a computer, instruct the computer to carry out the steps of a method as set forth in claim 1.

25. A computer-readable medium, on which the computer program as set forth in claim 24 is stored.

26. A device for optimizing a driver assistance system, comprising:
at least one environmental sensor for detecting an environmental parameter that characterizes surroundings of a vehicle;
at least one vehicle sensor for detecting a vehicle parameter that characterizes an operating state of the vehicle;
a first module that determines, on the basis of at least one of the environmental parameter and the vehicle parameter, a driving situation characteristic that characterizes a driving situation of the vehicle;
a second module that monitors an activity of the driver assistance system and determines from that a control intervention characteristic that characterizes the activity of the driver assistance system, wherein the activity includes a control intervention and an intensity of the control intervention or non-intervention; and
a third module that determines, on the basis of the control intervention characteristic and on the basis of at least one of the environmental parameter and the vehicle parameter as a function of the driving situation characteristic, a correction value that characterizes a subjective external perception of the driving situation by at least one passenger.

27. The device as set forth in claim 26, wherein the at least one environmental sensor is selected from the group consisting of: forward-looking radar and rearward-looking radar, forward-looking lidar, rearward-looking lidar, ultrasonic sensor, infrared camera, and high-resolution GPS.

28. The device as set forth in claim 26, wherein the at least one vehicle sensor is selected from the group consisting of: a gyrometer, a speedometer, an acceleration sensor, a normal or high-resolution GPS, a vibration sensor, an altimeter, a measuring device, a tachometer, a throttle valve position meter, a torque meter, a switch sensor, and a tank fill level sensor.

29. The device as set forth in claim 26, which has access to data from at least one vehicle on-board network, particularly a CAN.

30. The device as set forth in claim 29, wherein the at least one vehicle sensor and the at least one environmental sensor are installed as standard equipment in the vehicle.

31. A vehicle with a driver assistance system that monitors a driving situation of the vehicle with respect to at least one driving situation criterion and, if a driving situation criterion is not met, influences the driving situation by means of a control component through at least one control intervention, the vehicle further comprising a device for optimizing the driver assistance system as set forth in claim 26.

* * * * *